United States Patent
Julia Barges et al.

[11] Patent Number: 6,140,453
[45] Date of Patent: Oct. 31, 2000

[54] POLYURETHANE THERMOPLASTIC MATERIAL AND PRODUCTION PROCESS

[75] Inventors: Joaquim Julia Barges, Alella; Jose Luis Ayuso Piqueras, Barcelona, both of Spain

[73] Assignee: Merquinsa Mercados Quimicos, S.L., Montmelo, Spain

[21] Appl. No.: 09/242,109

[22] PCT Filed: Jun. 10, 1998

[86] PCT No.: PCT/ES98/00164

§ 371 Date: May 18, 1999

§ 102(e) Date: May 18, 1999

[87] PCT Pub. No.: WO98/56844

PCT Pub. Date: Dec. 17, 1998

[30] Foreign Application Priority Data

Jun. 11, 1997 [ES] Spain ...................................... 9701270

[51] Int. Cl.[7] .................................................. C08G 18/48
[52] U.S. Cl. ....................... 528/76; 528/354; 252/182.27; 525/533; 560/189
[58] Field of Search ................ 528/76, 354; 252/182.27; 525/533; 560/189

[56] References Cited

U.S. PATENT DOCUMENTS

| | | | |
|---|---|---|---|
| 3,051,687 | 8/1962 | Young | 560/189 |
| 4,055,549 | 10/1977 | Roberts | 528/80 |
| 4,186,261 | 1/1980 | Sprey | 528/75 |
| 4,439,599 | 3/1984 | Watanabe et al. | 528/80 |
| 4,447,591 | 5/1984 | Watanabe et al. | 528/80 |

FOREIGN PATENT DOCUMENTS

| | | |
|---|---|---|
| 630926 | 12/1994 | European Pat. Off. . |
| 458270 | 2/1978 | Spain . |
| 1376353 | 12/1974 | United Kingdom . |

OTHER PUBLICATIONS

Encyclopedia of Polymer Science, 1988, pp. 275, 276 vol. 13.

*Primary Examiner*—Rachel Gorr
*Attorney, Agent, or Firm*—Wenderoth, Lind & Ponack, L.L.P.

[57] ABSTRACT

The thermoplastic polyurethane material has the general formula I

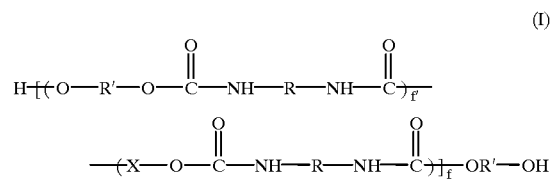

($1<f<500$; $1<f'<15$; R and R'=alkyl or aryl) and X has formula II

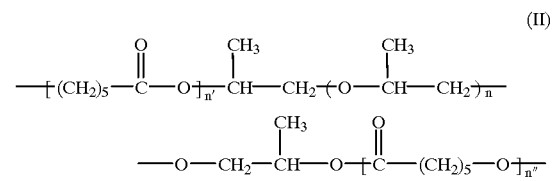

($2<n<140$; $1<(n'+n'')<51$). The process for the preparation thereof comprises reacting a polyether-polycaprolactone block copolymer having a molecular weight ranging from 1000 to 6000 of formula IIa

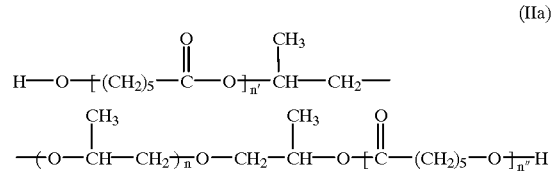

with a chain extender of formula HO—R'—OH and a diisocyanate of formula OCN—R—NCO.

11 Claims, No Drawings

POLYURETHANE THERMOPLASTIC MATERIAL AND PRODUCTION PROCESS

DESCRIPTION

The invention relates to a thermoplastic polyurethane material of general formula I:

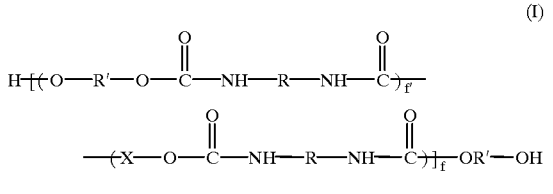

where f is an integer ranging from 1 to 500; f is an integer ranging from 1 to 15; R and R' are the same or different and stand for alkyl or aryl groups and X is a polyetherpolycaprolactone block copolymer having a molecular weight ranging from 1000 to 6000 and having formula II

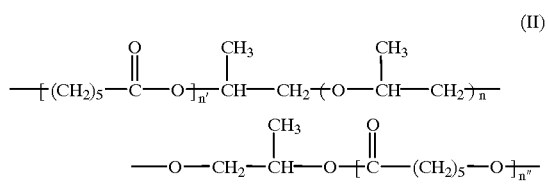

where n is an integer ranging from 2 to 140; n' and n" are integers the sum of which ranges from 1 to 51.

This polyurethane is particularly useful in extrusion, injection and melt coating operations.

The thermoplastic polyurethane materials of the present invention offer the advantage over the known ones that they have a relatively low hardness (they can attain values of around 86 shore A) and have relatively high melting or softening points, of around 220°.

The invention also relates to a process for the preparation of the above mentioned compound, the process comprising reacting a polyetherpolycaprolactone block copolymer of formula IIa

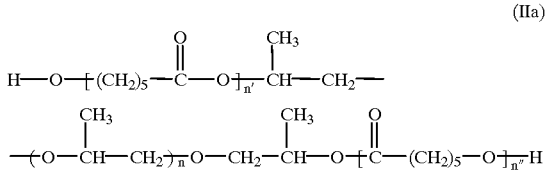

with a chain extender of formula HO—R'—OH and with a diisocyanate of formula OCN—R—NCO where R, R', n, n' and n" have the meaning given above. Said chain extender is preferably 1,4-butanediol and said diisocyanate is diphenyl methane 4,4'-diisocyanate, toluene 2,4- and 2,6-diisocyanate, dicyclohexyl methane 4,4'-diisocyanate or 3-isocyanomethyl-3,5,5-trimethylcyclohexyl isocyanate.

The reaction is also preferably conducted by mixing equimolecular amounts of diisocyanate with said chain extender and said polyetherpolycaprolactone block copolymer of formula II, said latter two compounds being in a proportion ranging from 1:1 to 15:1.

It is contemplated that mixing be continuous at a flowrate ranging from 200 to 1500 kg/h of total weight of the ingredients and that it should take place in an extruder at a temperature ranging from 150° to 350° C. and with a mean dwell time ranging from 45 seconds to 2.5 minutes.

The reaction is conducted preferably in the presence of metalcomplex based catalysts proper to the urethane reactions, particularly derivatives of tin and/or bismuth.

The invention also relates to the compound of formula IIa and to a process for the preparation thereof, which is conducted by reacting a polypropylene glycol with terminal hydroxy groups mainly of secondary nature and of formula III

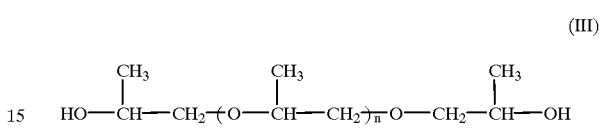

where n has the meaning given above, with ε-caprolactone of formula IV

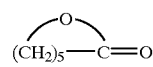

The thus obtained copolymer comprises terminal hydroxy groups mainly of primary nature in an amount in excess of 60% of the total hydroxy groups.

This reaction comprises the following steps:[a] charging the polypropylene glycol and the ε-caprolactone in a reactor at room temperature under a flow of nitrogen; [b] heating to a temperature ranging from 100° to 200° C. under a flow of nitrogen for a time ranging from 0.5 to 1.5 hours; [c] adding a metal-complex catalyst up to a temperature ranging from 160° to 250° C.; and [d] maintaining the reaction for a time ranging from 2 to 8 hours.

Some examples of the processes to which the invention relates are given below.

EXAMPLE 1

Preparation of a Formula II Polyol

A reactor at room temperature, with nitrogen flow and mechanical stirring is charged with 2,000 kg of polypropylene glycol and 2,000 kg of ε-caprolactone.

The raw reaction mass is heated to 120° C. and held at this temperature for an hour so as to remove the water from the starting products.

The raw reaction mass is heated to 200° C. and at this temperature 15 ppm of tin derivative metal-complex catalyst are added. The temperature of the reaction mass is rapidly raised to 220° C. and the evolution of the reaction is checked by gas chromatography. Once the reaction is completed after 5 hours, the reaction mass is cooled to 120° C. and discharged from the reactor at this temperature. The product obtained is stored under a nitrogen atmosphere.

The maximum heat given off at T=200° C. is 9.93 W/kg; the total heat given off by the reaction being 87.48 kJ/kg. An adiabatic temperature rise of 43.2° C. is calculated for the process.

The reaction power profile shows that the process increases the rate up to a maximum level at a point close to half the reaction time.

EXAMPLE 2

Preparation of a Thermoplastic Polyurethane Material 1,250 kg of diphenyl methane 4,-4'-diisocyanate, 360 kg of butanediol and 4,000 kg of the polyetherpolycaprolactone block copolymer prepared according to Example 1 are taken. These products are continuously mixed at a rate of 600 kg/h in a twin screw extruder having a configuration proper to that of a reactor, at a temperature which is held between 2000° and 300° C. with a mean dwell time ranging from 1.5 to 2.0 minutes.

On exiting from the extruder it is cut, cooled and dried and packaged in bead form under standard temperature and humidity conditions. During the process 100 ppm of metal-complex catalysts are used.

What is claimed is:

1. Thermoplastic polyurethane material of general formula I:

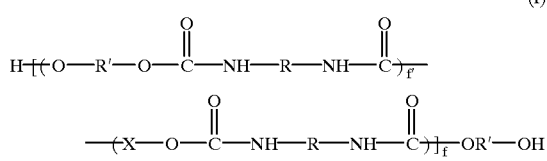

where f is an integer ranging from 1 to 500; f is an integer ranging from 1 to 15; R and R' are the same or different and stand for alkyl or aryl groups and X corresponds to formula II

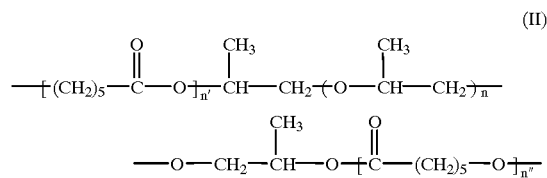

where n is an integer ranging from 2 to 140; n' and n" are integers the sum of which ranges from 1 to 51.

2. A process for the preparation of a thermoplastic polyurethane material of general formula I:

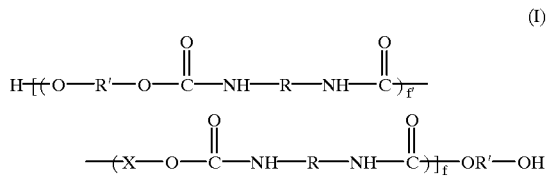

where f is an integer ranging from 1 to 500; f' is an integer ranging from 1 to 15; R and R' are the same or different and stand for alkyl or aryl groups and X corresponds to formula II

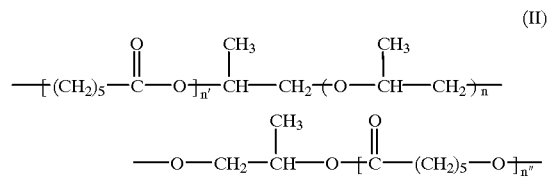

where n is an integer ranging from 2 to 140; n' and n" are integers the sum of which ranges from 1 to 51, the process comprising reacting a polyether-polycaprolactone block copolymer having a molecular weight ranging from 1000 to 6000 and having formula IIa

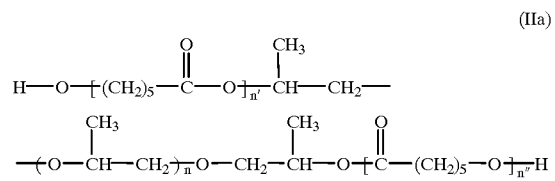

where n, n' and n" have the meaning given above, with a chain extender of formula HO—R'—OH and with a diisocyanate of formula OCN—R—NCO where R, R', have the meaning given above.

3. The process of claim 2, wherein said extender is 1,4-butanediol.

4. The process of claim 2, wherein said diisocyanate is diphenyl methane 4,-4'-diisocyanate, toluene 2,4- and 2,6-diisocyanate, dicyclohexyl methane 4,4'-diisocyanate or 3-isocyanomethyl-3,5,5-trimethylcyclohexyl isocyanate.

5. The process of claim 2, wherein the reaction is conducted by mixing equimolecular amounts of said diisocyanate with said chain extender and said polyether-polycaprolactone block copolymer of formula II, said latter two compounds being in a proportion ranging from 1:1 to 15:1.

6. The process of claim 5, wherein the mixing is continuous at a flowrate ranging from 200 to 150 kg/h of total weight of the ingredients and takes place in an extruder at a temperature ranging from 150° to 350° C. and with a mean dwell time ranging from 45 seconds to 2.5 minutes.

7. The process of claim 2, wherein said reaction is conducted in the presence of metal-complex based catalysts proper to the urethane reactions.

8. The process of claim 7, wherein said metals are tin and/or bismuth.

9. A polyether-polycaprolactone block copolymer of formula IIa,

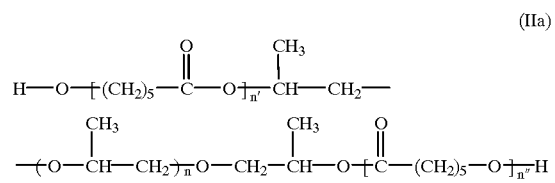

where n is an integer ranging from 2 to 140; and n' and n" are integers the sum of which ranges from 1 to 51.

10. A process for the preparation of a polyether-polycaprolactone block copolymer according to claim 9, of formula IIa,

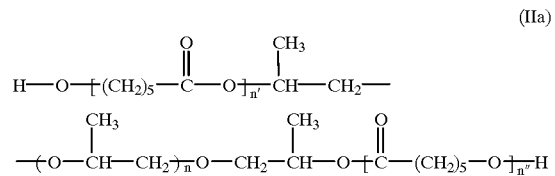

where n is an integer ranging from 2 to 140; and n' and n" are integers the sum of which ranges from 1 to 51, which comprises reacting a polypropylene glycol with terminal hydroxy groups mainly of secondary nature, of formula III (III)

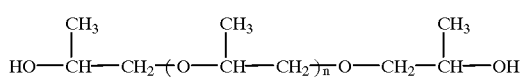

here n has the meaning given above, with ε-caprolactone of formula IV (IV)

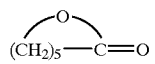

there being obtained a copolymer having terminal hydroxy groups mainly of primary nature, in an amount in excess of 60% of the total hydroxy groups.

11. The process of claim 10, wherein the reaction comprises the following steps:[a] charging the polypropylene glycol and the ε-caprolactone in a reactor at room temperature under a flow of nitrogen; [b] heating to a temperature ranging from 100° to 200° C. under a flow of nitrogen for a time ranging from 0.5 to 1.5 hours; [c] adding a metal-complex catalyst up to a temperature ranging from 160° to 250° C.; and [d] maintaining the reaction for a time ranging from 2 to 8 hours.

* * * * *